AUTOMATIC PICTURE PHASING CIRCUIT

Filed Feb. 1, 1947 4 Sheets-Sheet 1

INVENTOR
HANS W. G. SALINGER

BY [signature]

ATTORNEY

AUTOMATIC PICTURE PHASING CIRCUIT

Filed Feb. 1, 1947 4 Sheets-Sheet 2

INVENTOR
HANS W. G. SALINGER

BY [signature]

ATTORNEY

INVENTOR
HANS W. G. SALINGER
BY
ATTORNEY

INVENTOR
HANS W. G. SALINGER
BY [signature]
ATTORNEY

Patented Feb. 27, 1951 2,543,066

UNITED STATES PATENT OFFICE 2,543,066

AUTOMATIC PICTURE PHASING CIRCUIT

Hans W. G. Salinger, Fort Wayne, Ind., assignor, by mesne assignments, to Farnsworth Research Corporation, a corporation of Indiana Application February 1, 1947, Serial No. 725,880

7 Claims. (Cl. 178—6.8)

This invention relates generally to scanning systems, and more particularly pertains to a phase control network, such as an automatic picture phasing circuit which is applicable to a television system.

It has previously been suggested to scan a target, such as the photosensitive cathode of a picture signal generating tube in accordance with a Lissajous pattern. It is well known that a Lissajous pattern is obtained when an electron beam is deflected by an electrostatic or electromagnetic field developed by two sinusoidal waves of different frequencies. The repetition rate or field frequency of the Lissajous pattern is determined by the common denominator of the frequencies of the two scanning waves. A scanning system of this type inherently has a number of advantages. In view of the fact that the target is scanned continuously over a closed path, there will be no return trace and blanking is not required as in a conventional television scanning system. Furthermore, it is much simpler to keep the scanning waves at the transmitter and receiver in synchronism. Since scanning is effected by sinusoidal waves, there is no need for developing saw-tooth waves such as are required in accordance with the present television standards. It will be obvious that it is much easier to develop, amplify or transmit a sinusoidal wave than a saw-tooth wave.

The sinusoidal scanning waves may, for example, be transmitted on a suitable carrier wave which may be the video or audio carrier wave of a television system. In that case the sinusoidal scanning waves at the receiver will have the same frequencies as those at the transmitter. The scanning waves, however, will experience a phase shift with respect to the picture signals in view of the frequency discrimination of the transmission medium or of the networks and amplifiers provided at the receiver. It will, accordingly, be obvious that some means must be provided in a scanning system of the type referred to for keeping the two scanning waves in phase with the picture signals. Unless this is done, the picture reproduced at the receiver will break up into two or more component parts. It will furthermore be evident that each scanning wave must individually have a predetermined phase with respect to the picture signals.

It is an object of the present invention, therefore, to provide a circuit for keeping the picture signals developed by a signal generating tube in phase with the scanning waves in a scanning system of the type wherein the target of the tube is scanned in accordance with a Lissajous pattern.

Another object of the invention is to provide an automatic picture phasing circuit for a scanning system of the type referred to.

A further object of the invention is to provide means for keeping the phase of a scanning wave in a predetermined relation with a phasing signal developed when a predetermined area of the target of a signal generating device is scanned.

In accordance with the present invention there are provided, in a scanning system, a target and means for scanning the target including a scanning wave. Means are provided for developing a phasing signal when a predetermined elemental area of the target is scanned. Since the scanning wave has a definite phase when any given elemental target area is scanned, the scanning wave will have a predetermined phase at the instant the phasing signal is developed. There is further provided a phasing circuit comprising means for deriving an input wave at the frequency of the scanning wave and a phase shifter for shifting the phase of the input wave and for developing a phase-corrected output wave. Furthermore, the phasing circuit comprises a phase comparator for comparing the phase of the phase-corrected wave with the phasing signal to derive a control signal representative of the phase deviation of the corrected wave from its predetermined phase. The phase shifter in turn is responsive to the control signal to correct the phase of the input wave. Finally, there may be provided a device for utilizing the phase-corrected output wave, such, for example, as a picture reproducing tube of the cathode ray type.

For a better understanding of the invention, together with other and further objects thereof, reference is made to the following description, taken in connection with the accompanying drawings, and its scope will be pointed out in the appended claims.

Figure 1:
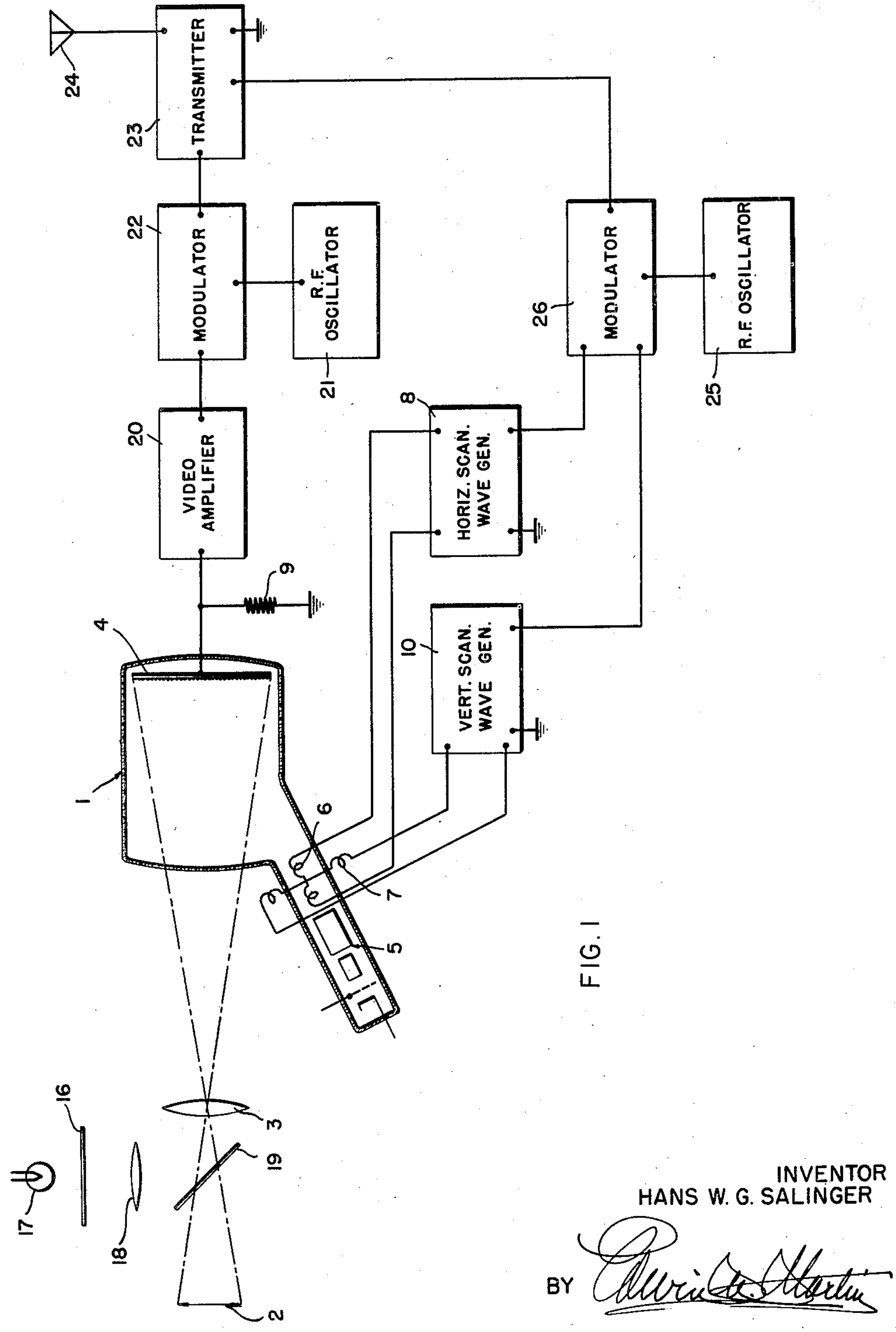
Fig. 1 is a schematic circuit diagram in block form of a television transmitter wherein a target is scanned in accordance with a Lissajous pattern.

Referring now to Fig. 1, there is illustrated schematically a television transmitter comprising picture signal generating tube 1 which may be of the charge storage type as illustrated. An image of object 2 is projected by lens system 3 onto mosaic electrode 4. Mosaic electrode 4 is scanned by an electron beam developed by electron gun 5 indicated schematically. The electron beam is deflected across mosaic electrode 4 by horizontal deflecting coils 6 and by vertical deflecting coils 7. Horizontal deflecting coils 6 are supplied with a sinusoidal horizontal scanning wave developed by wave generator 8, while vertical scanning coils 7 are fed by a sinusoidal vertical scanning wave developed by generator 10. The frequencies of the scanning waves developed by wave generators 8 and 10 differ from each other as will be explained presently. The electron beam developed by electron gun 5 accordingly traces a Lissajous pattern over mosaic electrode 4.

Figure 2:
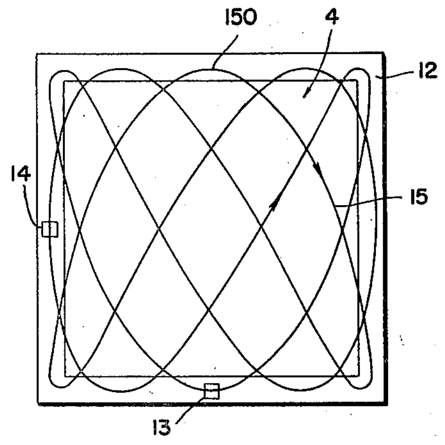
Fig. 2 illustrates a target used in the picture signal generating tube of the transmitter of Fig. 1 with the path of the scanning beam, the target having edge portions arranged to develop phasing signals for keeping the scanning waves in proper phase with the picture signals.

Referring now to Fig. 2, there is shown target or mosaic electrode 4 which may have optically projected on its outer edges a black frame 12. Frame 12 represents the image of shield 16 (Fig. 1) illuminated by light source 17 and projected on mosaic electrode 4 by lens system 18 and mirror 19 which is transparent to light from object 2. The lower horizontal edge of frame 12 is provided with a white portion or spot 13, while the left vertical edge of frame 12 has a white portion or spot 14. Spots 13 and 14 correspond to transparent areas in shield 16. A scanning path of the electron beam developed by electron gun 5 and deflected by deflecting coils 6 and 7 is indicated, by way of example, at 15. Deflecting path 15 is a Lissajous pattern which is obtained when the horizontal scanning wave is represented by $x = \sin 3at$, while the vertical scanning wave is represented by the formula $y = \cos 5at$. In these formulae $a$ is a parameter while $t$ is the time. It is of course to be understood that the frequencies of the horizontal and vertical scanning waves may have any desired values, the scanning path 15 being given by way of example only. In order to obtain high definition the scanning path of the electron beam should have a large number of lines, and the repetition rate or scanning cycle of the scanning pattern preferably should be of the order of 60 cycles per second to prevent flicker. The frequencies of the two scanning waves may, therefore, for example be equal to $f_x = 60{,}000$ and $f_y = 79{,}380$ cycles per second, respectively, with a repetition rate of 60 cycles per second corresponding to the common denominator of the two frequencies.

Figure 3:
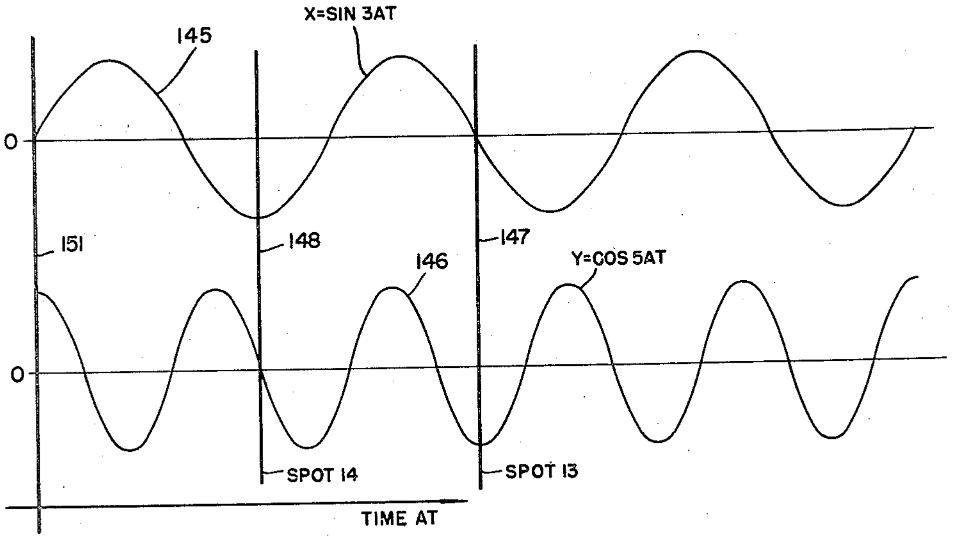
Fig. 3 is a graph of two sinusoidal waves which are utilized for deflecting the scanning beam through the path illustrated in Fig. 2.

It will be obvious that white spot or elemental area 13 on the lower horizontal edge of frame 12 is scanned when the vertical scanning wave has a minimum amplitude. This will be more clearly understood by referring to Fig. 3 where curve 145 represents the horizontal scanning wave corresponding to the formula $x = \sin 3at$ and curve 146 represents the vertical scanning wave corresponding to the formula $y = \cos 5at$. Whenever horizontal scanning wave 145 has a minimum amplitude, the left vertical edge of frame 12 is scanned and the vertical scanning wave 146 will have a certain phase or amplitude with respect to a reference point such as the ordinate of Fig. 3 indicated at 151. Thus, white spot or elemental area 13 is scanned at the instant shown by vertical line 147 in Fig. 3 when the vertical scanning wave 146 has a minimum amplitude while the horizontal scanning wave 145 passes through the zero axis. Similarly the left vertical edge of frame 12 is scanned whenever the horizontal scanning wave 145 has a minimum amplitude. Spot 14 provided on the left vertical edge of frame 12 is scanned at the instant indicated by vertical line 148, that is, when the horizontal scanning wave 145 has a minimum amplitude while the vertical scanning wave 146 passes through the zero axis.

It will be understood that any given elemental area of mosaic electrode 4 is scanned when the two scanning waves have simultaneously a certain phase or amplitude with respect to a reference line such as line 151. Thus, point 150 of scanning path 15 will be scanned when the two scanning waves 145 and 146 pass through reference line 151. At that instant the horizontal scanning wave passes through the zero axis and accordingly point 150 is half way between the left and right hand edges of mosaic electrode 4. At the same instant the vertical scanning wave 146 has a maximum amplitude so point 150 is disposed in the upper horizontal edge of frame 12. The scanning path proceeds from point 150 in a direction indicated by the arrows. The exact location of spots 13 and 14 is a matter of convenience and is determined by the desired relative phases or amplitudes of the scanning waves at the instant the spots are scanned.

Accordingly, when either spot 13 or 14 is scanned, a signal is developed that may be termed a phasing signal. This phasing signal may of course be developed when any predetermined elemental area of mosaic electrode 4 is scanned, the position of the area on the mosaic electrode determining in turn the phases of the two scanning waves. When mosaic electrode 4 is provided with frame 12 as illustrated in Fig. 2, the phasing signals are developed as part of the video signal train because the scanning pattern extends or overshoots into frame 12, as clearly shown in Fig. 2.

Figure 4:
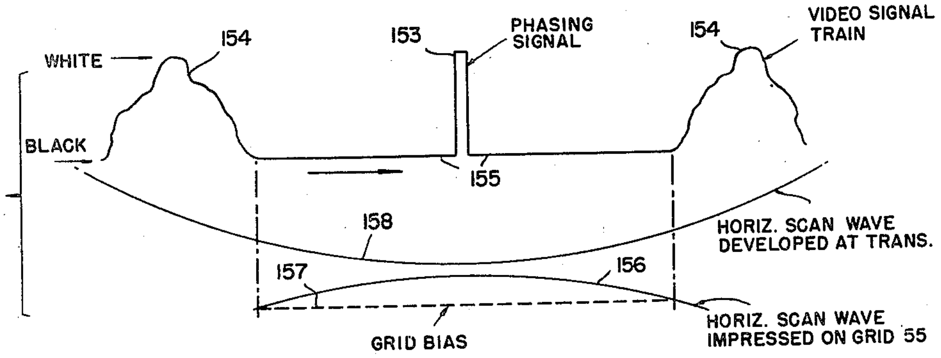
Fig. 4 is a graph of curves illustrating the video signal train at the instant one of the phasing signals is developed and the horizontal scanning wave developed at the transmitter and at the receiver at that instant.

Phasing signal 153 may be developed when white spot 14 is scanned, as illustrated in Fig. 4. It will be seen that phasing signal 153 forms part of the video signal train indicated at 154. It will also be observed that a zero signal corresponding to the black level is developed when the scanning beam scans frame 12 unless either white spot 13 or 14 are scanned. Accordingly, a zero signal 155 corresponding to the black level precedes and follows phasing signal 153 corresponding to that portion of scanning path 15 extending along frame 12 before and after white spot 14 is scanned. A portion of horizontal scanning wave 158 is also shown in Fig. 4 which occurs at the time video signal train 154 and phasing signal 153 are developed.

Instead of projecting spots 13 and 14 on mosaic electrode 4, conducting portions may be provided on the mosaic which are connected to the conducting back plate of the mosaic so that a signal is developed whenever the electron beam scans one of the conducting portions. A phasing signal of opposite polarity may be developed when frame 12 is white with the exception of spots 13 and 14 which are black. In that case a signal is developed whenever the scanning beam scans frame 12 unless spots 13 or 14 are scanned when no phasing signal is derived.

Referring again to Fig. 1, the video signal which is developed when mosaic electrode 4 is scanned by the electron scanning beam may be derived across load resistor 9 connected between ground and the conducting back plate of mosaic electrode 4. As has already been pointed out, the phasing signals such as phasing signal 153 will form part of the train of video signals. The video signal may be amplified by video amplifier 20. A carrier wave developed by radio frequency oscillator 21 may be modulated in accordance with the amplified video signal by modulator 22 connected to transmitter 23 which may contain the power amplifier and which may be connected to antenna 24 for radiating the video modulated carrier wave into space.

The horizontal and vertical scanning waves developed by wave generators 8 and 10 may also be transmitted on a carrier wave and radiated into space as is the video modulated carrier wave. For that purpose there may be provided radio frequency oscillator 25 for developing a carrier wave of a frequency that differs from that developed by oscillator 21. The carrier wave developed by oscillator 25 may be modulated by modulator 26 in accordance with the horizontal and vertical scanning waves derived from generators 8 and 10. The output of modulator 26 may be connected to transmitter 23 for further amplification, and the two carrier waves may be radiated simultaneously into space by antenna 24. Separate power amplifiers may be provided in transmitter 23 for the two carrier waves developed by modulators 22 and 26. It is of course to be understood that the two scanning waves may be transmitted in any other suitable manner such, for example, as on the audio carrier wave.

Figure 5:
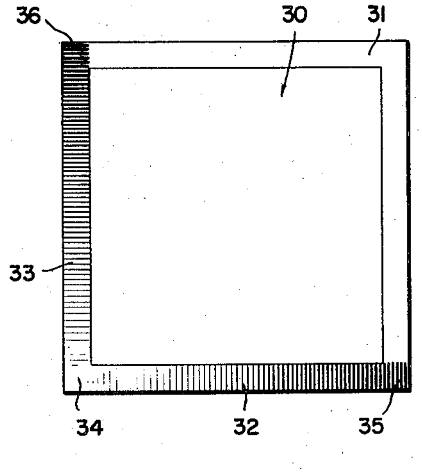
Fig. 5 illustrates an alternative target arranged for developing a different type of phasing signals.

Referring now to Fig. 5, there is shown an alternative target or mosaic electrode 30 which may, for example, be substituted for mosaic electrode 4 in iconoscope 1. Target 30 again has projected thereon or provided in any suitable manner an outer frame 31 including a lower horizontal edge portion 32 and a left vertical edge portion 33. As indicated schematically, edge portions 32 and 33 may be white on corner 34 corresponding to a transparent area of the shield, the image of which is projected on target 30. Edge portions 32 and 33 may gradually receive less light towards frame corners 35 and 36, respectively. Every time the vertical scanning wave has a minimum, edge portion 32 is scanned, and similarly edge portion 33 is scanned whenever the horizontal scanning wave has a minimum. Therefore, whenever the vertical scanning wave has a minimum, a phasing signal will be developed corresponding in amplitude to the brightness value of the elemental area of edge 32 which is scanned. In a similar manner another group of phasing signals is developed whenever the horizontal scanning wave has a minimum and scans edge portion 33. Thus two groups of phasing signals are developed which may be utilized for automatically keeping the two scanning waves at a predetermined phase with respect to the video signal.

Figure 6:
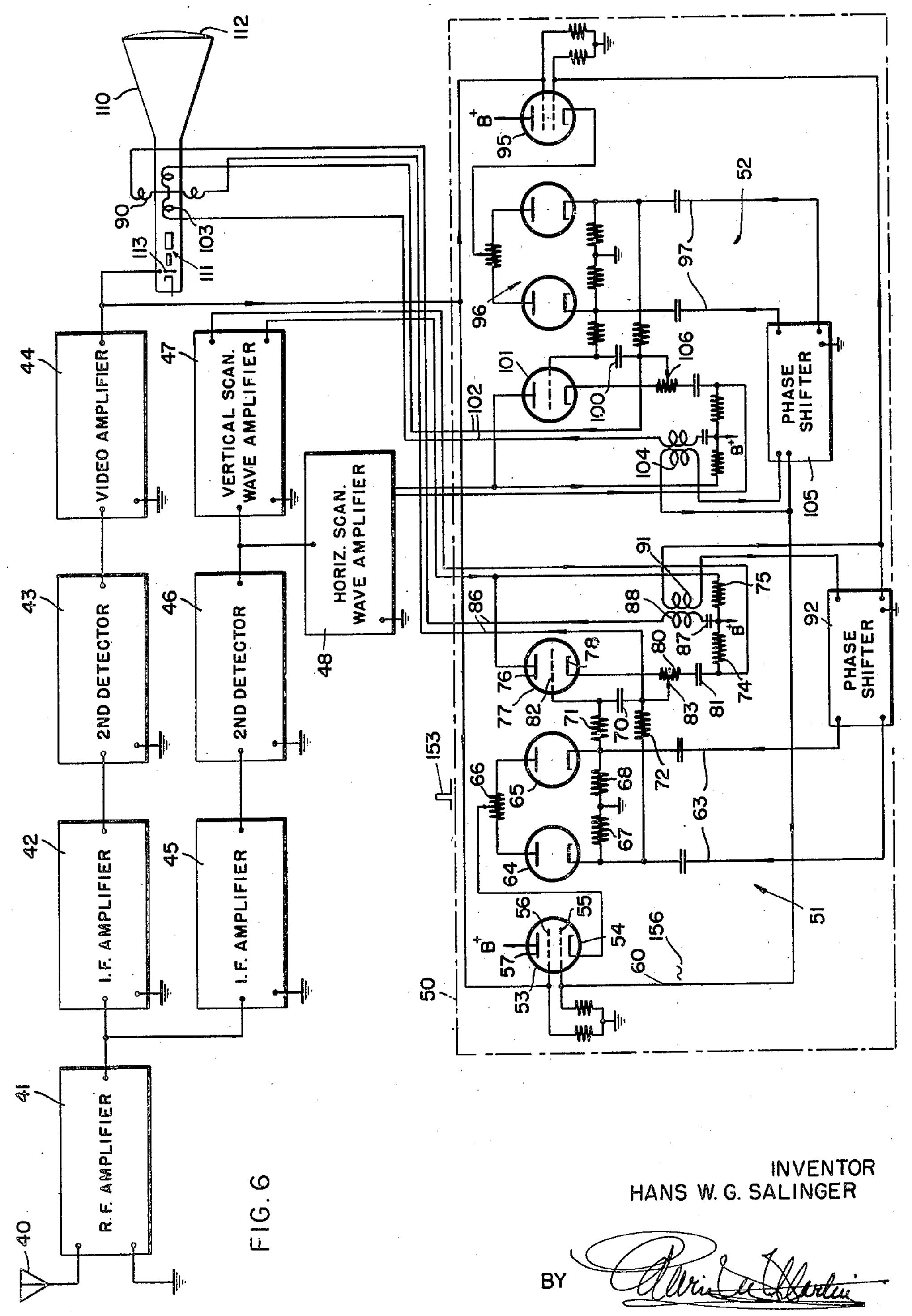
Fig. 6 is a circuit diagram, partly in block form, of a television receiver including an automatic picture phasing circuit embodying the instant invention.

Referring now to Fig. 6, there is illustrated a television receiver adapted to receive the modulated carrier waves transmitted by the transmitter of Fig. 1 and including an automatic picture phasing circuit in accordance with the present invention. The television receiver of Fig. 6 comprises antenna 40 for receiving the modulated carrier waves radiated by antenna 24 of the transmitter of Fig. 1. The two carrier waves radiated into space by the transmitter of Fig. 1 may be amplified by a broadly tuned radio frequency amplifier 41. The video carrier wave may be individually converted and amplified by frequency converter and intermediate-frequency amplifier 42 and detected by second detector 43 to derive the video signal which may again be amplified by video amplifier 44.

The second carrier wave which is modulated in accordance with the two scanning waves is segregated from the video carrier wave, converted and amplified by frequency converter and intermediate-frequency amplifier 45. The intermediate-frequency wave may be detected by second detector 46 whereupon the horizontal and vertical scanning waves are segregated by frequency selection and separately amplified by amplifier 47 arranged for amplifying the vertical scanning wave and by amplifier 48 which amplified the horizontal scanning wave.

The horizontal and vertical scanning waves which may be transmitted through space and received by the receiver of Fig. 6 may experience a phase shift with respect to the video signal. This would be detrimental for the faithful reproduction of the picture unless the phases of the scanning waves are corrected again so that the picture information may be reproduced at its proper position on the target of the picture reproducing tube. This is effected in accordance with the present invention by automatic picture phasing circuit 50. Picture phasing circuit 50 consists of two substantially identical networks 51 and 52.

Picture phasing network 51 operates to segregate phasing signal 153 (Fig. 4) developed when white spot 14 is scanned, from the video signal train 154. The segregated phasing signal 153 is utilized in picture phasing network 51 to develop a phase control signal for correcting the phase of the vertical scanning wave. On the other hand, picture phasing network 52 is arranged to segregate the phasing signal developed when white spot 13 is scanned, from the video signal train to derive another phase control signal. This second phase control signal is used for correcting the phase of the horizontal scanning wave. Furthermore, the phase-corrected horizontal scanning wave derived from network 52 is utilized in network 51 for segregating phasing signal 153 from the video signal train 154, while the phase-corrected vertical scanning wave derived from network 51 is used in network 52 for segregating the phasing signal, derived when white spot 13 is scanned, from the video signal train.

Picture phasing network 51 includes discharge tube 53 which may be a tetrode as shown or a pentode and which is arranged for segregating phasing signal 153, developed when white spot 14 (Fig. 2) is scanned, from the video signal 154. For this purpose discharge tube 53 may be arranged as a keyed amplifier. Keyed amplifier 53 comprises cathode 54, two control grids 55, 56 and anode 57 which may be connected to a suitable anode voltage supply indicated at B+. The video signal train 154 including phasing signal 153 obtained from the output of video amplifier 44 is impressed upon control grid 56.

Keyed amplifier 53 is normally biased inoperative. To this end control grid 55 is connected to lead 60 having impressed thereon a phase-corrected horizontal scanning wave obtained in a manner to be explained hereinafter from picture phasing network 52. The phase-corrected horizontal scanning wave is impressed in such a polarity on lead 60 that the scanning wave has a maximum as indicated at 156 in Fig. 4 at the time phasing signal 153 occurs whereupon keyed amplifier 52 is rendered operative. When white spot 14 is scanned, the horizontal scanning wave 158 at the transmitter has, of course, a minimum amplitude as illustrated in Fig. 4. Provided the phase of the horizontal scanning wave impressed upon control grid 55 is approximately correct, keyed amplifier 53 will be rendered conducting at the time phasing signal 153 which is of positive polarity, occurs. Keyed amplifier 53 accordingly functions to segregate from the video signal 154 phasing signal 153 which is developed when white spot 14 of the target of the transmitter is scanned.

It will be understood that keyed amplifier 53 remains nonconducting when a vertical black edge portion other than white spot 14 of target 4 is scanned at the transmitter because at that time a zero signal such as indicated at 155 (Fig. 4) is developed. Although the horizontal scanning wave impressed on control grid 55 has a maximum amplitude at that time, space current cannot flow through keyed amplifier 53 in view of the fact that a zero signal is impressed on control grid 56. Control grid 55 preferably has a suitable grid bias as indicated at 157 in Fig. 4 so that keyed amplifier 53 is only rendered operative when the vertical left edge portion of frame 12 is scanned at the transmitter.

This segregated phasing signal 153 is now compared with the phase of a phase-corrected vertical scanning or output wave obtained in a manner to be explained hereinafter from leads 63. To this end there is provided a phase comparator, comprising diodes 64 and 65 having their anodes tied together through resistor 66, the center tap of which is connected to cathode 54 of keyed amplifier 53. The cathodes of diodes 64 and 65 are connected to leads 63 and joined together through resistors 67 and 68, the junction point of which is grounded. Phase control condenser 70 has one terminal connected through resistor 71 to the cathode of diode 65 and its other terminal connected through resistor 72 to the cathode of diode 64.

Whenever keyed amplifier 53 is rendered conducting, a current will flow from B+ through keyed amplifier 53, resistor 66 and either through diode 64 and resistor 67 to ground or through diode 65 and resistor 68 to ground. Let it be assumed that the phase of the phase-corrected vertical scanning wave obtained from leads 63 is such that the cathode of diode 65 is more positive than the cathode of diode 64. Accordingly, more current will flow through diode 64 than through diode 65 when keyed amplifier 53 is rendered conducting. Therefore, the junction point of phase control condenser 70 with resistor 71 will be driven negative while the junction point of condenser 70 and resistor 72 will become more positive. The time constant of phase control condenser 70 and its associated resistors is such, that the variations of the voltages applied through leads 63 to the cathodes of diodes 64 and 65 will cancel out, so that only the phase of the phase-corrected vertical scanning wave is effective at the time keyed amplifier 53 becomes conducting for developing a phase control signal across condenser 70.

Phase control condenser 70 is now utilized in picture phasing circuit 51 for controlling and correcting the phase of an input wave derived from vertical scanning wave amplifier 47. However, instead of transmitting the vertical and horizontal scanning waves, they may also be developed at the receiver of Fig. 6 with the correct frequency and their phase may be corrected by impressing the locally derived wave upon automatic picture phasing circuit 50. The output wave derived from amplifier 47 or developed at the receiver is applied across resistors 74 and 75 connected in series and having their junction point connected to a suitable anode voltage supply indicated at B+. Resistor 75 is connected to anode 76 to resistance tube 77 while cathode 78 of resistance tube 77 is connected to resistor 74 through cathode resistor 80 and condenser 81 arranged in series. The terminal of phase control condenser 70 connected to resistor 71 is also connected to control grid 82 of resistance tube 77 while the other terminal of condenser 70 is connected to cathode resistor 80 by variable tap 83.

It will accordingly be seen that phase control condenser 70 controls the space current through resistance tube 77, and therefore, the plate or anode resistance of the tube. If the potential across phase control condenser 70 changes, the bias applied to grid 82 will also change, whereby the plate resistance of resistance tube 77 is controlled in accordance with the phase of the phase-corrected vertical scanning wave obtained from leads 63.

Figure 7:
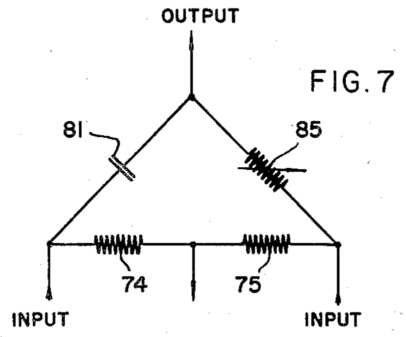
Fig. 7 illustrates the equivalent circuit of the phase shifting network employed in the picture phasing circuit of Fig. 6.

Referring now to Fig. 7 there is illustrated the equivalent circuit of the phase shifting network which includes resistors 74, 75, condenser 81 and variable resistor 85 which represents the plate resistance of resistance tube 77. Cathode resistor 80 which has a small resistance has been disregarded in Fig. 5. The phase shifting network illustrated in Fig. 7 is conventional. The uncorrected input wave may be applied across resistors 74 and 75 connected in series, the input wave being represented by the vertical scanning wave derived from amplifier 47. The phase-corrected output wave may be obtained as indicated in Fig. 7 between the junction point of resistors 74 and 75 and the junction point between condenser 81 and variable resistor 85. By varying, for example, the resistance of resistor 85, the phase of the output wave is shifted with respect to that of the input wave.

Referring again to Fig. 6 a phase-corrected output wave is obtained from output leads 86, one of which is connected to the junction point of resistors 74 and 75 through blocking condenser 87 and inductance element 88, while the other one is connected to the junction point of resistor 72 and tap 83, that is, effectively between condenser 81 and resistance tube 77. Leads 86 are connected to vertical scanning coils 90. Inductance element 91 is inductively coupled to coil 88 and is connected to leads 63 through phase shifter 92. The phase-corrected vertical output wave is accordingly impressed through leads 63 on the phase comparator including diodes 64 and 65, whereby a phase control signal is derived from the phase-corrected vertical output wave to correct in turn this output wave until it has its predetermined phase with respect to the phasing signal.

The phase shifting network including resistance tube 77 may be adjusted by means of variable tap 83. Tap 83 determines the normal grid bias of resistance tube 77 and accordingly its plate resistance in the absence of the phase control signal. Thus, by setting tap 83 the phase-corrected output wave may be adjusted to the desired phase which will then be automatically maintained.

Alternatively the phase shifting network may be adjusted by means of phase shifter 92 which shifts the phase of the phase-corrected output wave before it is applied to the phase comparator including diodes 64, 65. It is to be understood that phase shifter 92 is optional and may be omitted.

Picture phasing network 52 operates in substantially the same manner as does network 51 and is effective to correct the phase of the horizontal scanning wave. The phasing signal forming part of the train of video signals is again applied to one of the control electrodes of keyed amplifier 95 to segregate the phasing signal developed when white dot 13 of target 4 is scanned from the video signal. Keyed amplifier 95 is normally inoperative and has another control grid upon which the phase-corrected vertical output wave obtained from coil 91 is impressed in such a polarity that the wave has substantially a maximum amplitude at the time the predetermined phasing signal arrives. This predetermined phasing signal is developed when white dot 13 on the lower edge of frame 12 of the target 4 at the transmitter is scanned.

The segregated phasing signal is now applied to a phase comparator indicated at 96 which functions in the same manner as the phase comparator of picture phasing network 51. By means of leads 97 a phase-corrected horizontal scanning wave is impressed on phase comparator 96 for comparing its phase with the phasing signal segregated by keyed amplifier 95 from the video signal. The direct current output of the phase comparator is again applied to a phase control condenser 100 which controls the resistance of resistance tube 101 in the manner previously explained. Resistance tube 101 forms one branch of a phase shifting network such as illustrated in Fig. 7 which develops a phase-corrected horizontal output wave which is obtained from output leads 102 connected in turn to horizontal deflecting coils 103.

The phase-corrected horizontal output wave is also impressed upon inductance element 104 which is connected through phase shifter 105 to input leads 97 of phase comparator 96. The picture phasing network 52 may be adjusted in the manner previously explained in connection with network 51 either by phase shifter 105 or by variable tap 106 which controls the grid bias of resistance tube 101.

The wave impressed by lead 60 upon control grid 55 of keyed amplifier 53 is also obtained from coil 104 and represents the phase-corrected horizontal output wave. It will accordingly be seen that picture phasing networks 51 and 52 are mutually interdependent. The phase-corrected horizontal output wave obtained from network 52 is utilized in network 51 for segregating the phasing signal 153 from the video signal 154, while the phase-corrected vertical output wave derived from network 51 is impressed in network 52 on keyed amplifier 95 for segregating its associated phasing signal from the video signal. Furthermore, from each of the two phase-corrected output waves a further phase-correcting control signal is derived for correcting the phases of the output waves to their predetermined values with respect to their associated phasing signals.

The action of picture phasing circuit 50 as explained hereinbefore is based upon the type of phasing signals derived during each field or each recurring scanning cycle of the Lissajous scanning pattern with the target illustrated in Fig. 2. When a target of the type illustrated in Fig. 5 is used at the picture signal generating tube of the transmitter, two groups of phasing signals are derived during each picture field. One group of phasing signals is developed whenever the horizontal scanning wave has a minimum, while the other group of phasing signals is developed when the vertical scanning wave has a minimum. Automatic picture phasing circuit 50 may also be used for this type of phasing signals.

The two automatic control networks 51 and 52 form the product of each group of phasing signals with one of the scanning waves. The average phase control current derived from the phase comparator is then proportional to the integral of the product of one group of phasing signals and of one of the scanning waves, the integral being taken over a time interval corresponding to one picture field. In that case the phase control current is a maximum when the phase of the scanning wave has the correct value. By adjusting phase shifters 92 and 105 to shift the phase of the phase-corrected output waves through 90 degrees, the phase control current can be made a minimum because the 90 degrees phase shift changes a sine wave to a cosine wave so that the circuit operates again in the manner previously explained. If the phasing signals are developed by the target of Fig. 5, phase shifters 92 and 105 are essential to the operation of the circuit of Fig. 6

The two phase-corrected output waves derived from picture phasing networks 51 and 52 may be utililized in picture reproducing tube 110 which may be of the cathode ray type. Cathode ray tube 110 includes electron gun 111 indicated schematically which develops an electron beam and focuses it on fluorescent screen 112 of tube 110. Electron gun 111 comprises control grid 113 upon which the video signal may be impressed which has been amplified by video amplifier 44 so that the electron beam has its intensity modulated in accordance with the video signal. The electron beam is deflected across luminescent screen 112 by vertical deflecting coils 90 and by horizontal deflecting coils 103 through which the phase-corrected sinusoidal output waves flow which are derived from phasing networks 51 and 52. The luminescent pattern traced by the electron beam on screen 112 is accordingly in synchronism and in correct phase with the Lissajous scanning pattern traced on the target at the transmitter.

Figure 8:
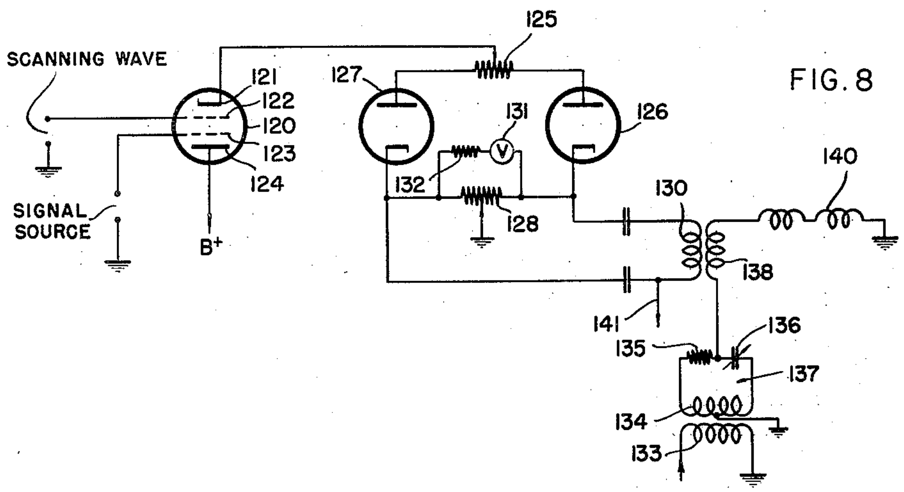
Fig. 8 is a circuit diagram of a manually operable picture phasing circuit in accordance with the invention.

Referring now to Fig. 8 there is illustrated a manually operable picture phasing circuit including discharge tube 120 which may for example, be a tetrode as illustrated, or a pentode. Discharge tube 120 operates as a keyed amplifier and comprises cathode 121, control grids 122, 123 and anode 124 which may be connected to a suitable voltage supply indicated at B+. The video signal train including a phasing signal to be segregated may be impressed upon control grid 123. A scanning wave, such for example, as a horizontal scanning wave may be impressed upon control grid 122.

Keyed amplifier 120 is normally inoperative and is rendered operative when the horizontal scanning wave impressed upon control grid 122 has a maximum. At that time the phasing signal will drive control grid 123 positive so that the tube conducts space current. Cathode 121 is connected to the center tap of resistor 125 having its terminals connected to the anodes of diodes 126 and 127 arranged in parallel. The cathodes of diodes 126 and 127 are tied together through resistor 128 having its center point grounded as shown. An input wave which may be the vertical scanning wave is impressed upon coil 130 having its terminals connected to the cathodes of diodes 126 and 127. Volt meter 131 is connected across resistor 128 and may have in series therewith resistor 132.

Diodes 126 and 127 form a phase comparator which functions to compare the phase of the input wave impressed upon coil 130 with the phasing signal segregated from the video signal by keyed amplifier 120. Volt meter 131 accordingly indicates the phase deviation of the vertical input wave from its predetermined phase. The uncorrected vertical scanning wave may be impressed on input coil 133 having inductively coupled thereto output coil 134, the center point of which is grounded. Output coil 134 is connected in series with variable resistor 135 and variable condenser 136 which, together with coil 134, form a phase shifting network 137 of the type illustrated in Fig. 7. The only difference is that resistors 74 and 75 of the network of Fig. 7 are replaced by coil 134 having its center connected to ground.

Resistor 135 and condenser 136 may be adjusted in accordance with the indications obtained from volt meter 131. The phase-corrected output wave obtained from phase shifting network 137 may be impressed upon coil 130 through coil 138. Vertical scanning coils 140 may be fed by the phase-corrected output wave derived from phase shifting network 137.

The manually operable phase control network of Fig. 8 may replace, for example, automatic picture phasing circuit 51 illustrated in Fig. 6. In that case two circuits as illustrated in Fig. 8 are required, one for deriving a phase-corrected vertical scanning wave and the other one for deriving a phase-corrected horizontal scanning wave. The phase-corrected vertical scanning wave which may be derived, for example, from output lead 141 may be impressed in another control circuit on one of the control grids of a keyed amplifier similar to amplifier 120 of the circuit of Fig. 8 for developing a phase-corrected horizontal output wave. The horizontal wave impressed on control grid 122 of keyed amplifier 120 may be obtained, in turn, from the second control circuit. Volt meter 131 may either indicate a maximum or a minimum voltage when the phase of the scanning wave is correct, depending upon whether the phasing signals are derived from the target of Fig. 5 or from a target such as illustrated in Fig. 2.

In certain applications where the phase shift of the scanning waves does not vary appreciably with time, the circuit of Fig. 8 may be preferred over that illustrated in Fig. 6 in view of its greater simplicity. However, when the phases of the scanning waves change constantly, an automatic picture phasing circuit such as illustrated in Fig. 6 will be required.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a scanning system, a target, means for scanning said target including means for generating a substantially sinusoidal scanning wave, means for developing a video signal upon scansion of said target including a phasing signal derived when a predetermined elemental edge portion of said target is scanned, whereby said phasing signal is developed when said scanning wave has a predetermined phase corresponding to an extreme amplitude; a phasing circuit for automatically keeping said scanning wave at said predetermined phase comprising means for deriving an input wave at the frequency of said scanning wave, a phase shifter for shifting the phase of said input wave and for developing a phase-corrected output wave, means including a normally inoperative space discharge device responsive to the extreme amplitude of said phase-corrected wave for segregating said phasing signal from said video signal, a phase comparator for comparing the phase of said phase-corrected wave with said segregated phasing signal to derive a control signal representative of the phase deviation of said corrected wave from said predetermined phase, said phase shifter being responsive to said control signal to correct the phase of said input wave, and a device for utilizing said phase-corrected wave.

2. In a television system, a master station comprising a target, means for scanning said target including means for generating a first and a second substantially sinusoidal scanning wave, means for developing a video signal upon scansion of said target including a first phasing signal derived when said first scanning wave has a predetermined phase corresponding to an extreme amplitude while said second scanning wave has another predetermined phase and a second phasing signal derived when said second scanning wave has a predetermined phase corresponding to an extreme amplitude while said first scanning wave has another predetermined phase; a slave station comprising a phasing circuit for automatically keeping said scanning waves at said predetermined phases including means for deriving a first input wave at the frequency of said first scanning wave and a second input wave at the frequency of said second scanning wave, a first phase shifter for shifting the phase of said first input wave to derive a first phase-corrected output wave, a second phase shifter for shifting the phase of said second input wave to derive a second phase-corrected output wave, means for segregating said phasing signals from said video signal including a first and a second normally inoperative space discharge device, means for impressing said video and phasing signals on said devices, said first device being responsive to an extreme amplitude of said first phase-corrected wave for segregating said first phasing signal from said video signal, said second device being responsive to an extreme amplitude of said second phase-corrected wave for segregating said second phasing signal from said video signal, a first phase comparator for comparing the phase of said first phase-corrected wave with one of said segregated phasing signals to develop a first control signal, a second phase comparator for comparing the phase of said second phase-corrected wave with another one of said segregated phasing signals to develop a second control signal, said first phase shifter being responsive to said first control signal, said second phase shifter being responsive to said second control signal, said control signals being adapted to control said phase shifters until said phase-corrected waves have again said predetermined phases with respect to said phasing signals, and a device for utilizing said phase-corrected waves.

3. In a television system, a master station comprising a target, means for scanning said target including means for generating a horizontal and a vertical substantially sinusoidal scanning wave, means for developing a video signal upon scansion of said target including a first phasing signal derived when a predetermined elemental horizontal edge portion of said target is scanned and a second phasing signal derived when a predetermined elemental vertical edge portion of said target is scanned, whereby said first phasing signal is developed when said vertical scanning wave has a phase corresponding to an extreme amplitude and said second phasing signal is developed when said horizontal scanning wave has a phase corresponding to an extreme amplitude; a slave station comprising a phasing circuit for automatically keeping said scanning waves at said predetermined phases including means for deriving a horizontal input wave at the frequency of said horizontal scanning wave and a vertical input wave at the frequency of said vertical scanning wave, a first phase shifter for shifting the phase of said horizontal input wave to derive a horizontal phase-corrected output wave, a second phase shifter for shifting the phase of said vertical input wave to derive a vertical phase-corrected output wave, means for segregating said phasing signals from said video signal including a first and a second normally inoperative space discharge device, means for impressing said video and phasing signals on said devices, said first device being responsive to an extreme amplitude of said vertical phase-corrected wave for segregating said first phasing signal from said video signal, said second device being responsive to an extreme amplitude of said horizontal phase-corrected wave for segregating said second phasing signal from said video signal, a first phase comparator for comparing the phase of said horizontal phase-corrected wave with said first segregated phasing signal to develop a first control signal, a second phase comparator for comparing the phase of said vertical phase-corrected wave with said second segregated phasing signal to develop a second control signal, said first phase shifter being responsive to said first control signal, said second phase shifter being responsive to said second control signal, said control signals being adapted to control said phase shifters until said phase-corrected waves have again said predetermined phases with respect to said phasing signals, and a device for utilizing said phase-corrected waves.

4. In a television system, a transmitter comprising means for generating first and second scanning signals waves, means for generating other signals, means for generating first and second phasing signals having predetermined time relations with respect to said scanning waves, means for combining said other and said phasing signals and means for transmitting said combined phasing and other signals, and a receiver comprising means for developing first and second scanning waves having the same frequency as the first and the second scanning waves generated at said transmitter, means for receiving said transmitted signals, a normally non-responsive device for segregating said first phasing signals from said other signals, means for coupling the received signals to said device, means for rendering said device responsive to said first phasing signal comprising means for coupling said second scanning wave developing means to said device, means connected to said first scanning wave developing means and said segregating means for comparing the phase of said first phasing signals with the scanning waves developed by said first scanning wave developing means, means connected to said comparing means and said first scanning wave developing means for correcting the phase of said last-mentioned scanning waves and means for utilizing said last-mentioned scanning waves.

5. In a television system wherein phasing signals are transmitted in combination with other signals, a television receiver comprising a scanning device, means for developing first and second scanning waves for said device, means for receiving said phasing and other signals, a normally blocked amplifier having input and output circuits, means for coupling said receiving means of the input circuit of said amplifier, means for unblocking said amplifier during predetermined intervals of said second scanning waves comprising means for coupling said second scanning waves to said amplifier, means coupled to the output of said amplifier and to said means for developing said first scanning waves for controlling the phase of said first scanning waves and means for coupling the controlled scanning waves to said scanning device.

6. In a television system, a transmitter, comprising means for generating first and second scanning signal waves, means for generating other signals, means for generating first and second phasing signals having predetermined phaseal relations with said first and second scanning signals respectively, means for transmitting said first and second phasing signals and said other signals as a composite signal train, means for transmitting said first and second scanning waves, and a receiver, comprising means for receiving said first and second scanning waves and said composite signal train, means for separating said first and second scanning waves, a first phase shifter for shifting the phase of said first scanning wave to derive a first phase-corrected wave, a second phase shifter for shifting the phase of said second scanning wave to derive a second phase-corrected wave, means for segregating said first and second phasing signals from said signal train including means responsive to said first phase-corrected wave for passing said second phasing signals and means responsive to said second phase-corrected wave for passing said first phasing signals, means for comparing said first and second phasing signals with said first and second phase-corrected waves respectively to obtain control voltages proportional to the phase deviation of said corrected waves from said phasing signals, means for correcting the phases of said first and second scanning waves in accordance with said control voltages and means for utilizing said corrected scanning waves.

7. In a television system, a transmitter, comprising means for generating first and second scanning waves, means for generating other signals, means for generating first and second phasing signals indicative of predetermined phaseal relations with respect to said first and second scanning waves, means for transmitting said phasing signals and said other signals as a composite signal wave, means for transmitting said scanning waves; a receiver operative to receive all of said transmitted signals, comprising means for separating said first and second scanning waves, circuit means individually responsive to said first and second scanning waves for developing first and second phase-corrected waves, means responsive to said composite signal wave and said first phase-corrected wave for segregating said second phasing signal, means responsive to said composite signal wave and said second phase-corrected wave for segregating said first phasing signal, means for comparing said first and second phasing signals with said first and second phase-corrected waves respectively to obtain control voltages proportional to the phase deviation of said corrected waves from said phasing signals, means for correcting the phasing of said first and second scanning waves in accordance with said control voltages and means for utilizing said corrected scanning waves.

HANS W. G. SALINGER.

REFERENCES CITED

The following references are of record in the file of this patent:

UNITED STATES PATENTS

| Number | Name | Date |
|---|---|---|
| Re. 22,055 | Toulon | Mar. 24, 1942 |
| 1,590,270 | Watson | June 29, 1926 |
| 1,605,930 | Egerton | Nov. 9, 1926 |
| 2,012,480 | Reich | Aug. 27, 1935 |
| 2,075,898 | Horton | Apr. 6, 1937 |
| 2,104,801 | Hansell | Jan. 11, 1938 |
| 2,231,971 | Tubbs | Feb. 18, 1941 |
| 2,231,998 | Guanella | Feb. 18, 1941 |
| 2,242,633 | Toulon | May 20, 1941 |
| 2,256,530 | Seeley | Sept. 23, 1941 |
| 2,263,641 | Nicholson | Nov. 25, 1941 |
| 2,310,197 | Hansell | Feb. 2, 1943 |
| 2,329,339 | DeBaun | Sept. 14, 1943 |
| 2,339,536 | Wendt | Jan. 18, 1944 |
| 2,344,810 | Fredendall | Mar. 21, 1944 |
| 2,359,649 | Kahn | Oct. 3, 1944 |
| 2,371,905 | Mathes | Mar. 20, 1945 |
| 2,399,421 | Artzt | Apr. 30, 1946 |
| 2,428,946 | Somers | Oct. 14, 1947 |
| 2,455,323 | Townsend | Nov. 30, 1948 |
| 2,458,156 | Fredendall | Jan. 4, 1949 |

FOREIGN PATENTS

| Number | Country | Date |
|---|---|---|
| 174,606 | Great Britain | May 25, 1923 |
| 269,834 | Great Britain | Apr. 21, 1927 |
| 315,362 | Great Britain | Feb. 27, 1939 |